No. 823,544. PATENTED JUNE 19, 1906.
J. PARKER.
MEANS FOR TRANSPORTING RABBIT OR POULTRY HUTCHES OR THE LIKE.
APPLICATION FILED JAN. 2, 1906.
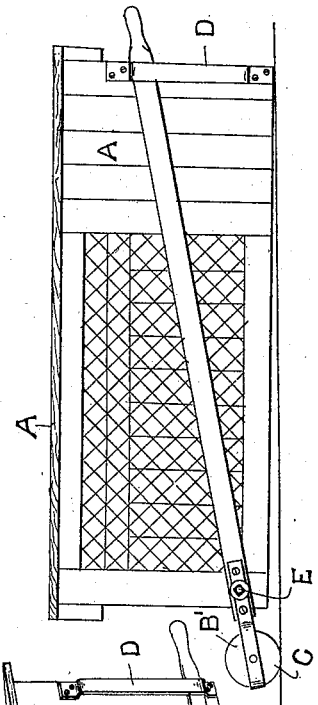
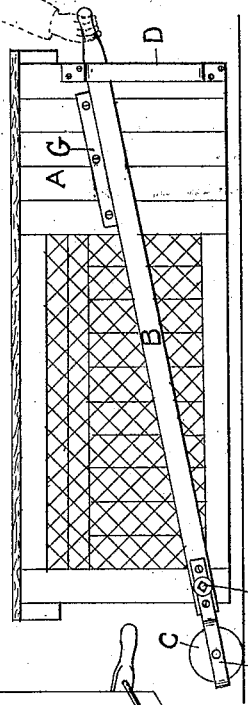
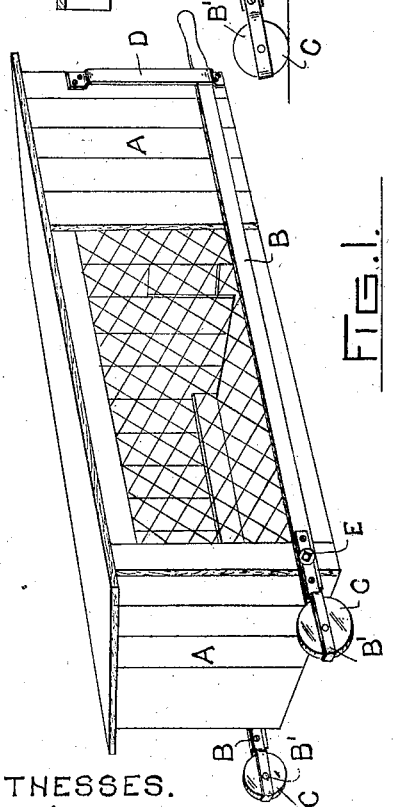
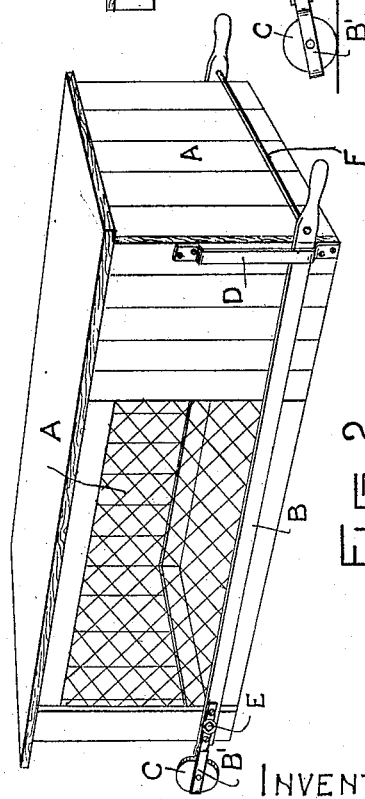
WITNESSES.
INVENTOR.

UNITED STATES PATENT OFFICE.

JOHN PARKER, OF MANCHESTER, ENGLAND.

MEANS FOR TRANSPORTING RABBIT OR POULTRY HUTCHES OR THE LIKE.

No. 823,544.

Specification of Letters Patent.

Patented June 19, 1906.

Application filed January 2, 1906. Serial No. 294,305.

*To all whom it may concern:*

Be it known that I, JOHN PARKER, a subject of the King of Great Britain and Ireland, and a resident of Manchester, England, have invented a new and Improved Means for Transporting Rabbit or Poultry Hutches and the Like, of which the following is a specification.

In the rearing of young rabbits and poultry it is customary to house them in a portable open-bottomed hutch or a hutch having a woven-wire floor, so that they may feed on the grass beneath the hutch, and it is also customary to move the hutch from time to time to a fresh place, so as to obtain a fresh supply of grass. With hutches of large size and even of medium or small size the moving of the same is a troublesome task and is usually the work of two or more persons, and unless the hutch is properly and carefully moved it tends to damage the turf or spoil the new grass. A further drawback is that the hutch when so moved is not always carried horizontally, and the utensils or fittings within the hutch are thus liable to be upset, besides also disturbing the rabbits or poultry.

The object of this invention is to provide cheap, simple, and easily-applied means whereby a hutch may be readily moved from place to place by one person only and in a horizontal or substantially horizontal plane, and therefore without risk of damaging the fresh grass or disturbing the contents of the hutch.

According to the invention I provide each of the, by preference, longitudinal sides of the hutch with a long bar or lever and pivot the lever at a point near one end and near to the bottom edge of the hutch, the major portion of each bar lying alongside the hutch and only a short length projecting beyond the hutch at either end. To one end of each bar I fit a wheel or roller and the other I end form into a handle. At the end of the hutch where the handles come I provide guides for the bars to work through, the upper and lower parts acting as stops. When the hutch is lying flat on the ground, the bars are horizontal and lie in the lower parts of the guides.
When it is required to move the hutch to a fresh place, the handle ends of the bars are lifted until the bars abut against the upper parts of the guides, by which time the end of the hutch nearest the wheels is raised clear of the ground, the wheels acting as the fulcra. The handle ends of the bars are then still further raised, when the other end of the hutch is also raised and the entire hutch thus held clear of the ground and made free to be wheeled about in a like manner to a wheelbarrow, only in a horizontal instead of an angular position. Upon lowering the handles and allowing them to resume their normal positions the hutch again rests on the ground.

Upon the accompanying drawings, Figure 1 illustrates an ordinary rabbit-hutch with my invention applied thereto, the view being taken from the wheel end of the hutch. Fig. 2 illustrates the same hutch, but from the handle end. Figs. 3 and 4 illustrate geometric side elevations of the hutch and serve to show the manner in which first the front edge of the hutch is raised (see Fig. 3) and then the rear end. (See Fig. 4.)

The invention applies to any make of hutch, but chiefly to that shown in the drawings, which is made of wood with the usual doors, partitions, and wire screen, and either open bottom or fitted with a woven-wire floor.

A is the body of the hutch, B B are the two bars or levers, C C the wheels, and D the guides forming my invention. Each bar is by preference about two and one-half inches wide by one inch thick and about a foot to fifteen inches longer than the hutch. Each bar is pivoted upon a plain pin or bolt E, secured to the hutch side as near to one end of the hutch and as low down as its wheel C and guide D will allow with the hutch resting flat on the ground. Each wheel C is by preference carried by a U-shaped metal extension B' of the bar B, which is bolted firmly at each end to the opposite faces of the bar end. Instead, however, of such arrangement the bar end may be fitted with a forked cap and the wheel be axially mounted between the forks of the cap.

In Figs. 1 and 2 the hutch is resting on the ground, the bars being in their normal (at rest) position. In Fig. 3 the two handle ends of the bars are raised into abutment with the top parts of the guides D, thus holding raised one end of the hutch.

In Fig. 4 the handle ends are further raised, thus causing both ends of the hutch to be raised and the hutch made free to be wheeled to a fresh place. On the bars being lowered one end of the hutch first touches the ground and then the other, and by the time the levers are at rest the hutch is resting solidly on the ground by its own lower edges. To insure the simultaneous lifting of both bars, they may be joined by a cross-rod F, as shown in Fig. 2. To prevent undue strain on the levers, the sides of the hutch may be fitted with plates G, against the edges of which the levers will bear when raised. (See Fig. 4.)

What I claim is—

In combination, a hutch, a fixed stud on each side of the hutch and near one end, a long lever mounted near one end on each stud, a roller and roller axis carried by each lever at such end, and the opposite ends of the levers formed as handles, and guides fixed to the hutch through which the handle ends of the levers pass, substantially as and for the purposes herein set forth.

In witness whereof I have hereunto set my hand in the presence of two witnesses.

JOHN PARKER

Witnesses:
    REGINALD HULME,
    JOHN CAMP.